United States Patent Office 3,746,748
Patented July 17, 1973

3,746,748
INSECT CONTROL AGENTS
Josef Ratusky and Frantisek Sorm, Prague, Czechoslovakia, assignors to Ceskoslovenska Akademie Ved, Prague, Czechoslovakia
No Drawing. Filed May 4, 1970, Ser. No. 34,598
Claims priority, application Czechoslovakia,
May 14, 1969, 3,415/69
Int. Cl. C07c 69/54
U.S. Cl. 260—486 R             12 Claims

ABSTRACT OF THE DISCLOSURE

Juvenile hormone insect control agents based on esters derived from unsaturated acids of the acrylic acid type. Chlorinated esters and epoxides of esters are also disclosed and are useful as insect control agents.

---

The present invention relates to novel compounds possessing juvenile hormone activity for the control of insects, compositions for the treatment of insects, the method for treating insects with the insect control agents, and methods for making the novel compounds.

The possibility of controlling insects through juvenile hormone level and the control of juvenile hormone was recognized some years ago in connection with experiments performed on hormones extracted from the male Cecropia moths. Synthetic compounds possessing juvenile hormone activity have been prepared in recent years based on an acid possessing the sesquiterpenoid chain. Synthetic insect control agents have also been prepared from the sesquiterpenoid alcohol, farnesol.

It has been established based on early work in the field of insect physiology that juvenile hormones are secreted by insects at certain stages in their lives. It is one of the secretions of insects which regulate growth and control the metamorphosis from larva to pupa to adult insect. In the stage where the mature larva undergoes metamorphosis into the sexually mature adult, the flow of juvenile hormone ceases. If during this period the larva comes into contact with the juvenile hormone a lethal derangement of further development takes place which results in failure of the larva to mature. The ultimate effect is that the insects are incapable of reproducing.

In one embodiment, the present invention relates to new ester compounds derived from unsaturated acids and an alcoholic component of the terpenoid character, for example, geraniol or 2-methyl-2-hepten-6-ol.

In a further embodiment, the present invention relates to chlorinated esters derived from unsaturated acids of the acrylic acid type.

In a still further embodiment, the present invention relates to epoxides of the esters derived from unsaturated acids of the acrylic acid type.

Expressed in terms of structure, the novel ester compounds of the present invention may be represented by the following formula:

(I)            $R^1\text{—}C\text{=}C\text{—}COOR^4$
                     $|\quad|$
                     $R^2\ R^3$ wherein the symbols $R^1$, $R^2$ and $R^3$ designate hydrogen atoms or alkyl groups containing from 1 to 5 carbon atoms.

Where the term "alkyl" is used herein, it refers to straight or branched chain, saturated aliphatic hydrocarbon groups having a chain length of 1 to 5 carbon atoms including methyl, ethyl, propyl, i-propyl, t-butyl and pentyl.

In the foregoing formula $R^4$ represents the geranyl residue:

(a) 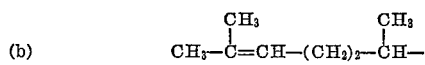

or 2-methyl-2-hepene-6-yl, also known as 2-methylhept-2-en-6-yl:

(b)       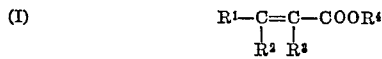

Esters having the above formula can be prepared by effecting a transesterification of lower esters of the corresponding acrylic acid by an alcohol of the terpenoid character in the presence of an alkaline catalyst and a secondary amine. Suitable catalysts include sodium hydroxide, potassium hydroxide, sodium carbonate, potassium carbonate, potassium bicarbonate, and the like. Piperidine is an example of a secondary amine that can conveniently be used in this reaction, however, other representative secondary amines can be used for this reaction as will be clear to those skilled in the art.

The reaction to prepare the ester compounds of Formula I can be represented by the following equation:

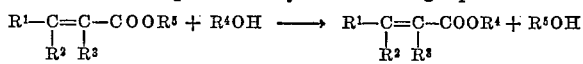

wherein $R^1$, $R^2$, $R^3$ and $R^4$ have the same meaning as above and $R^5$ is lower alkyl, e.g. 1 to 5 carbon atoms and generally most conveniently is methyl.

Identification of esters according to the present invention and determination of the position of the double bond in respect of the ester grouping can be effected by nuclear magnetic resonance measurements.

The following examples illustrate the embodiment of the invention relating to compounds of Formula I:

EXAMPLE 1

The alkaline transesterification of methyl methacrylate (10.0 g.; 0.1 mol) with geraniol (15.4 g.; 0.1 mol) is effected in the presence of piperidine and cations of an alkali metal, e.g., Na+ (5% by weight of geraniol). The reaction mixture is stirred at 60° C. for 2 hours, poured into water, and extracted without delay with two 100 ml. portions of ether. The etheral extracts are dried and evaporated. The unreacted methyl methacrylate is removed by distillation and the residue is chromatographed on 1000 g. of neutral alumina (Brockmann activity II) in benzene. The required product is isolated (14 g.) from the first fractions of the eluate and purified by distillation in vacuum of an oil pump. Yield, 9.0 g. of geranyl methacrylate, B.P. 130° C./10 mm. Hg. For $C_{14}H_{22}O_2$ (222.3) calculated: 75.6% C, 10.0% H; found: 75.43% C, 9.82% H.

EXAMPLE 2

The reaction is effected in analogy to Example 1 except for the use of 2-methyl-2-hepten-6-ol (12.8 g.) instead of geraniol. The reaction mixture is worked up also in analogy to Example 1. Yield, 7.6 g. of 2-methyl-2-hepten-6-yl methacrylate, B.P. 125–128° C./10 mm. Hg. For $C_{12}H_{20}O_2$ calculated: 73.5% C, 10.25% H; found: 73.2% C, 10.35% H.

Esters of the above Formula I exhibit a medium juvenile hormone activity in the range of 10 to 100 micrograms of the substance per specimen, particularly beetles. This will be discussed in further detail hereinafter below.

One of the advantages of the esters according to Formula I resides in the fact that they can really be converted to still other novel compounds having new and useful properties.

Therefore, it is a further embodiment of this invention to provide chlorinated esters of compounds of Formula I. These chlorinated esters are obtained by the addition of hydrogen chloride to one or more double bonds of the esters of Formula I. Thus, the chlorinated esters are represented by the formula:

(I)   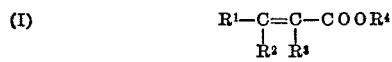

wherein $R^1$, $R^2$ and $R^3$ are defined as above and where $R^4$ is represented by the following structural formulae:

(II)  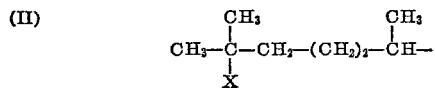

(III) 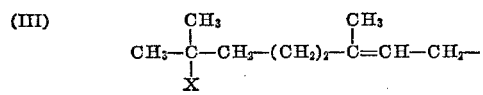

(IV)  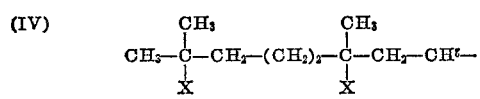

(V)   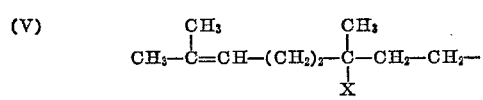

wherein X is chlorine (Cl)

The preparation of the chloro derivatives according to the present invention can be carried out by saturating a solution of the parent ester (Formula I) in a non-polar solvent with dry hydrogen chloride. The isolation of the resulting chloro derivative is performed by simple evaporation of the solvent in vacuo at a moderate temperature.

The following examples illustrate this embodiment of the invention:

EXAMPLE 3

Geranyl methacrylate hydrochloride

Geranyl methacrylate (2.2 g.; 0.01 mol) obtained according to Example 1 above was dissolved in dry ether (20 ml.) and the resulting solution was saturated under external ice-cooling and under exclusion of atmospheric moisture (calcium chloride guard tube) with dry hydrogen chloride. The reaction mixture was then evaporated at room temperature under vacuum of a water pump and then an oil pump. As shown by elemental analysis, the residual viscous colorless oil contained 1 chloro atom per molecule. As shown by NMR (nuclear magnetic resonance) spectra, the hydrogen chloride added to the double bond more distant from the ester grouping. For $C_{14}H_{23}O_2Cl$ (258.75) calculated: 65.0% C, 8.95% H, 13.7% Cl; found: 65.3% C, 9.15% H, 13.45% Cl.

EXAMPLE 4

2-methyl-2-hepten-6-yl methacrylate hydrochloride 2-methyl-2-hepten-6-yl methacrylate (1.95 g.; 0.01 mol) obtained according to Example 2 above was dissolved in dry ether (20 ml.). The solution was saturated with hydrogen chloride and processed in the same way as in Example 3. As shown by NMR spectra, the hydrogen chloride added to the double bond of the alcoholic component of the ester molecule. For $C_{12}H_{21}O_2Cl$ (232.75) calculated: 61.8% C, 9.05% H, 15.2% Cl; found: 61.5% C, 8.8% H, 14.85% Cl.

According to a still further embodiment of the present invention it has been determined that epoxide derivatives can be prepared from the esters of unsaturated acids.

Thus, the epoxy compounds of the present invention can be represented by the general formula:

(I)   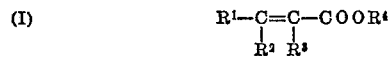

wherein $R^1$, $R^2$ and $R^3$ have the same meaning as above and where $R^4$ designates the residue of geraniol or 2-methyl-2-hepten-6-ol which is modified by the formation of epoxide rings from one or more of the double bonds. Thus, the $R^4$ can have the following structures:

(VI)   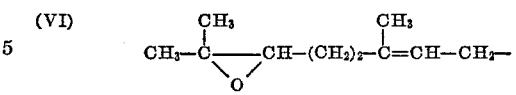

(VII)  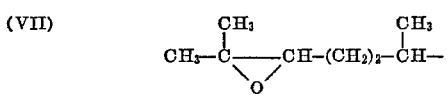

(VIII) 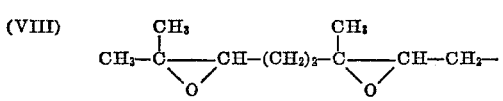

(IX)   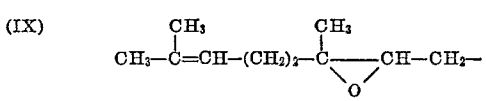

The epoxide derivatives corresponding to the above formulae can be prepared by reacting the parent ester (Formula I) with a small excess, i.e. 20%, of organic peracids; for example, perphthalic acid or perbenzoic acid. A suitable solvent such as ether can be used if desired. The product can be purified by washing the ethereal solution of the reaction mixture with a dilute aqueous solution of an alkali hydroxide to remove the acid; i.e. the phthalic acid formed during the reaction and the remaining excess perphthalic acid. The epoxide ring is considerably sensitive to acid media and therefore acid should be removed. The final purification is performed by column chromatography on neutral alumina.

The following examples illustrate this embodiment of the invention.

EXAMPLE 5

Geranyl methacrylate epoxide

A solution of geranyl methacrylate (2.2 g.; 0.01 mol) in dry ether (5 ml.) was placed into a 100 ml. flask protected against atmospheric moisture (calcium chloride guard-tube) and externally cooled by ice. Ethereal perphthalic acid (13 ml.; 0.01 mol+20% excess) was then added dropwise from a separatory funnel through a thin layer of magnesium sulfate (the ethereal solution contained 0.18 g. of perphthalic acid per 1 ml.). In the course of the addition, phthalic acid began to deposit on walls of the flask. The addition of perphthalic acid took about 15 minutes. The reaction mixture was then allowed to stand for 30 minutes. The supernatant ethereal solution was decanted from crystals of phthalic acid and washed with 2% aqueous sodium hydroxide (50 ml.). The residual phthalic acid crystals were shaken with a mixture of additional 50 ml. of ether and 50 ml. of 2% aqueous sodium hydroxide, and the ethereal layer was separated. The ethereal solutions were combined, washed with water (50 ml.), dried over anhydrous magnesium sulfate, and evaporated. The residual colorless viscous oil was purified on a column of neutral alumina (150 g.). Elution with benzene afforded the desired product (1.38 g.; 60%). As indicated by NMR spectrum, the product contained one epoxide ring on the geranyl residue at the double bond more distant from the ester linkage, and represented a mixture of cis and trans isomers. For $C_{14}H_{22}O_3$ (238.3) calculated: 70.7% C, 9.2% H; found: 70.3% C, 9.4% H.

EXAMPLE 6

2-methyl-2-hepten-6-yl methacrylate epoxide

The reaction was performed according to the process of Example 5 except for the use of an equivalent amount of 2-methyl-2-hepten-6-yl methacrylate (1.95 g.; 0.01 mol) instead of geranyl methacrylate. Also the isolation of the product was effected in the same manner as described in Example 5. Yield, 1.25 g. (60%) of the title compound containing one epoxide ring (in the alcoholic portion) per molecule. For $C_{12}H_{20}O_3$ (212.3) calculated: 73.5% C, 10.2% H; found: 72.95% C, 10.45% H.

Juvenile hormone activity of the esters of the above formula and their chlorinated and epoxide derivative was tested in the standard method consisting of topical application of a solution of the test substance in acetone to larvae of (1) *Pyrrhocoris apterus*, (2) *Dysdercus intermedius*, and (3) *Graphosoma italicum*; and to pupae of (4) *Galleria mellonella* and (5) *Tenebrio molitor*.

Therefore, in accordance with another feature of the present invention there is provided a method for the control of insects which comprises contacting the insects with a compound selected from those hereinbefore described in an amount effective to inhibit the metamorphosis of the insects. To aid in achieving a uniform distribution of application, it is advantageous to employ a composition comprising an inert carrier, and as the essential active ingredient the selected ester compound, chlorinated derivative or epoxide thereof.

One method for the control of insects in accordance with the present invention is to apply the composition comprising an inert carrier and a compound of the above formula to the locus of insect infestation such as to the plant life on which the insects live. These compositions can be either solid or liquid. Solid compositions for treating insects can be prepared by incorporating the active compound with an inert carrier such as finely divided talc, silica, pyrophyllite, clay or other granular inert carriers such as the vermiculites.

Liquid compositions may also be conveniently used. Most often these are prepared by mixing the active compound of the above formula with inert solvent materials or diluents such as acetone, xylene, peanut oil, cottonseed oil, sesame seed oil and other vegetable oils and mineral oils, conventionally employed as carriers for insect control formulations for applications by spraying. Emulsions containing the active ingredient can also be used. Other ingredients can be present in the compositions of the present invention to aid in the effective application of the active ingredients such as wetting agents, dispersing agents, insect attractants and the like.

The concentration of the active ingredient in the carrier composition can vary greatly and will depend on a variety of factors such as the specific insect involved, degree of insect infestation, locus of insect infestation, environmental and weather conditions and type of application device used. Generally, the composition will contain less than 95% by weight of the active ingredient and more frequently less than 10% by weight. Generally at least about 0.05% by weight should be used.

The compounds of the above formulae are useful insect control agents by virtue of their ability to inhibit the metamorphosis of selected insects. This refers to the direct as well as the indirect effect of these compounds on the insects. In general, the compounds of the present invention have an indirect insect control effect in that upon contact with the selected compounds in the egg stage, larva stage or pupa stage, the insect is unable to pass from one metamorphic stage to the next stage in a normal manner.

The juvenile hormone activity of the ester compounds of Formula I was tested topically on freshly moulted larvae of the last instar of the following Hemiptera: (1) *Pyrrhocoris apertus*, (2) *Dysdercus intermedius* and (3) *Graphosoma italicum*. In the case of (4) *Galleria mellonella*, and (5) *Tenebrio molitor*, the substance was injected into freshly moulted pupae. The hormonal activity was evaluated according to the degree of preservation of the larval or pupal epidermal structures. The following table shows the medium amount of hormone in micrograms which when applied to the insect (topical treatment) resulted in abnormal development.

TABLE I.—JUVENILE HORMONE ACTIVITY FOR ESTERS

| Test substance | Insect species | | | | |
|---|---|---|---|---|---|
| | 1 | 2 | 3 | 4 | 5 |
| Geranyl methacrylate (Example 1) | 10 | >10 | | | >10 |
| 2-methyl-2-hepten-6-yl methacrylate (Example 2) | 10 | 10 | >10 | >10 | 10 |

NOTE.—The medium value of the juvenile hormone activity is expressed in gama (microgram) amounts of the test substance.

It has been determined that the chlorinated derivatives of esters derived from unsaturated acids of the acrylic type exhibit greater juvenile hormone activity than do the esters. The juvenile hormone activity of the chlorinated derivative of the esters, namely, geranyl methacrylate hydrochloride (product of Example 3) and 2-methyl-2-hepten-6-yl methacrylate hydrochloride (product of Example 4) were tested topically on freshly moulted larvae (or pupae) using an acetone solution as well as by an injection procedure. Larvae of (1) *Pyrrhocoris apertus*, (2) *Dysdercus intermedius*, (3) *Graphosoma italicum* and pupae of (4) *Galleria mellonella* and (5) *Tenebrio molitor* were employed.

The following table shows the hormonal activity expressed in terms of the medium value of the juvenile hormone activity in micrograms of the test substance. In each case, the insect when treated topically with the medium value of the substance developed abnormally.

TABLE II.—JUVENILE HORMONE ACTIVITY OF CHLORINATED DERIVATIVES OF ESTERS OF UNSATURATED ACIDS

| Test substance | Insect species | | | | |
|---|---|---|---|---|---|
| | 1 | 2 | 3 | 4 | 5 |
| Example 3 | 1 | | 10 | | 10 |
| Example 4 | 0.7 | 0.5 | | 1 | 1 |

It has further been established that the juvenile hormone activity of the epoxide derivatives of the ester compounds of Formula I such as geraniol methacrylic epoxide or 2-methyl-2-hepten-6-yl methacrylate epoxide is greater than the esters. The epoxides were tested topically on freshly moulted larvae of the last instar of the following Hemiptera: (1) *Pyrrhocoris apertus*, (2) *Dysdercus intermedius*, (3) *Graphosoma italicum*, and the pupae of (4) *Galleria mellonella* and (5) *Tenebrio molitor*.

The following table shows the juvenile hormone activity expressed in terms of the medium value in microgram of the test substance which produced abnormal development in each insect.

TABLE III.—JUVENILE HORMONE ACTIVITY OF EPOXIDE COMPOUNDS

| Test substance | Insect species | | | | |
|---|---|---|---|---|---|
| | 1 | 2 | 3 | 4 | 5 |
| Product of Example 5 | 10 | 10 | | | 10 |
| Product of Example 6 | 1 | 10 | 10 | 10 | 1 |

It is clear from the foregoing data that the unexpected increased activity, particularly in the case of topical application, of the chlorinated esters and epoxide compounds in respect of the ester original parent compounds is unexpected and could not be predicted from the structure of the compounds. Therefore, the chlorinated compounds and the epoxy compounds represent the preferred embodiment of this invention.

We claim:

1. A compound represented by the following structural formula:

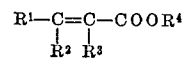

wherein $R^1$, $R^2$ and $R^3$ are independently hydrogen or alkyl groups containing from 1 to 5 carbon atoms, and $R^4$ is selected from the following formulae:

(a) $$CH_3-\underset{\underset{}{CH_3}}{C}=CH-(CH_2)_2-\underset{\underset{}{CH_3}}{C}=CH-CH_2-$$

(b) $$CH_3-\underset{\underset{}{CH_3}}{C}=CH-(CH_2)_2-\underset{\underset{}{CH_3}}{CH}-$$

(c) $$CH_3-\underset{\underset{X}{\overset{|}{C}}}{\overset{CH_3}{|}}-CH_2-(CH_2)_2-\underset{\underset{}{CH_3}}{CH}-$$

(d) $$CH_3-\underset{\underset{X}{\overset{|}{C}}}{\overset{CH_3}{|}}-CH_2-(CH_2)_2-\underset{\underset{}{CH_3}}{C}=CH-CH_2-$$

(e) $$CH_3-\underset{\underset{X}{\overset{|}{C}}}{\overset{CH_3}{|}}-CH_2-(CH_2)_2-\underset{\underset{X}{\overset{|}{C}}}{\overset{CH_3}{|}}-CH_2-CH_3$$

(f) $$CH_3-\underset{\underset{}{CH_3}}{C}=CH-(CH_2)_2-\underset{\underset{X}{\overset{|}{CH}}}{\overset{CH_3}{|}}-CH_2-$$

wherein X is chlorine.

2. A compound as set forth in claim 1 wherein $R^3$ is methyl.

3. A compound as set forth in claim 2 wherein $R^1$ and $R^2$ are hydrogen.

4. A compound as set forth in claim 3 wherein $R^4$ is Formula a.

5. A compound as set forth in claim 3 wherein $R^4$ is Formula b.

6. A compound as set forth in claim 3 wherein $R^4$ is Formula c.

7. A compound as set forth in claim 3 wherein $R^4$ is Formula d.

8. A compound as set forth in claim 1 wherein $R^1$, $R^2$ and $R^3$ are hydrogen.

9. A compound as set forth in claim 8 wherein $R^4$ is Formula a.

10. A compound as set forth in claim 8 wherein $R^4$ is Formula b.

11. A compound as set forth in claim 1 represented by the following structural formula:

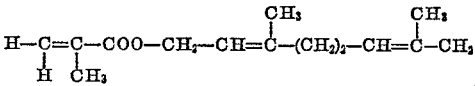

12. A compound as set forth in claim 1 represented by the following structural formula:

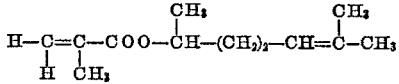

References Cited
UNITED STATES PATENTS 3,584,015   6/1971   Lee et al. ......... 260—348 A LORRAINE A. WEINBERGER, Primary Examiner P. J. KILLOS, Assistant Examiner U.S. Cl. X.R.

260—348 A, 348.5 L, 408, 410.9 N, 486 H; 424—278, 312, 314